United States Patent [19]

Herkner et al.

[11] 3,956,916

[45] May 18, 1976

[54] METHOD AND APPARATUS FOR MAKING FISHING LURES

[76] Inventors: Edward C. Herkner, 4407 Plum, Boise, Idaho 83703; John J. Turner, 6005 Northview, Boise, Idaho 83704

[22] Filed: Feb. 24, 1975

[21] Appl. No.: 552,100

[52] U.S. Cl. .................................. 72/217; 72/129
[51] Int. Cl.² ........................................ B21D 7/028
[58] Field of Search ........................... 72/216–217, 72/219

[56] References Cited
UNITED STATES PATENTS

| | | |
|---|---|---|
| 2,852,064 | 9/1958 | Weber et al. .......................... 72/217 |
| 3,260,091 | 7/1966 | Shaw, Jr. .......................... 72/217 X |

*Primary Examiner*—Milton S. Mehr

[57] ABSTRACT

The mandrel produces curved articles, such as fishing lures, from rod or tubing which have a sloping leading side and a rectilinear, substantially L-shaped side opposite. The mandrel is provided with a suitable, controlled reciprocating turning means which comprises a base and die assembly, a bending assembly, a die hold-down assembly and tensioning means provided between the hold-down assembly and the base and die assembly.

1 Claim, 5 Drawing Figures

METHOD AND APPARATUS FOR MAKING FISHING LURES

FIELD OF INVENTION

The present invention relates to metal working and more particularly to means for making curved products and metal bends.

BACKGROUND OF THE INVENTION

It is a primary object of this invention to provide an improved mandrel for making curved products from tubular or rod material which may be automatically or semi-automatically operated, the product having a sloping leading edge and a rectilinear, substantially L-shaped side opposite.

It is a further object that the aforesaid mandrel be of relatively simple and durable construction.

It is a still further object of this invention that the present mandrel be operable with cutting apparatus which may cut product bent in the mandrel to predetermined lengths.

It is another object of this invention that aforesaid mandrel be operable with a simple actuator and handling apparatus, such as a milling machine.

These and other objects shall become apparent from the description following, it being understood that modificatons may be made without affecting the teachings of the invention here set out.

SUMMARY OF THE INVENTION

The mandrel produces curved articles, such as fishing lures, from rod or tubing which have a sloping leading side and a rectilinear substantially L-shaped side opposite. The mandrel is provided with a suitable, controlled reciprocating turning means which comprises a base and die assembly including a mounting portion, an upstanding cylindrical collar carried by the mounting portion, a turning collar on the cylindrical collar, the turning collar having an upstanding stop portion, a turning guide carried by the turning collar and including an annular groove in one side thereof, the annular groove issues into a second annular groove in the uppermost planar surface of said turning collar, a pivot post carried by the turning collar distally mounted from the turning guide, a cut-off slot in the upstanding turning guide, an upstanding material hold-down assembly locking pin and a rod or tubing stock stop pivotally carried at one of the terminal ends of the turning guide; a bending assembly including a mounting frame having a sleeve portion suitably fastened to one of its terminal ends, a base portion fastened to the mounting frame, the base portion including an upstanding block carried near one of its terminal ends, the block having a pair of outwardly projecting brackets, and die roller journalled for rotation between the brackets, the bending assembly being rotatably carried by the sleeve on the cylindrical collar of the base and die assembly; a die hold-down assembly having one of its terminal edges rounded to correspond with the innermost face of the turning guide of the base and die assembly and its opposite terminal edge and side terminal edges being straight, the die hold-down assembly being pivotally carried on said pivot post of the base and die assembly, the die hold-down assembly including an annular groove and a cut-off slot in registry and correspondence with the groove and the cut-off slot of the base and die assembly being juxtapositioned by the upstanding locking post of the base and die assembly; and tensioning means provided between the hold-down assembly and the base and die assembly.

A more thorough and comprehensive understanding may be had from the detailed description of the preferred embodiment when read in connection with the drawings forming a part of this specification

DETAILED DESCRIPTION OF THE PREFERRED EMBODIMENT

Figure 1:
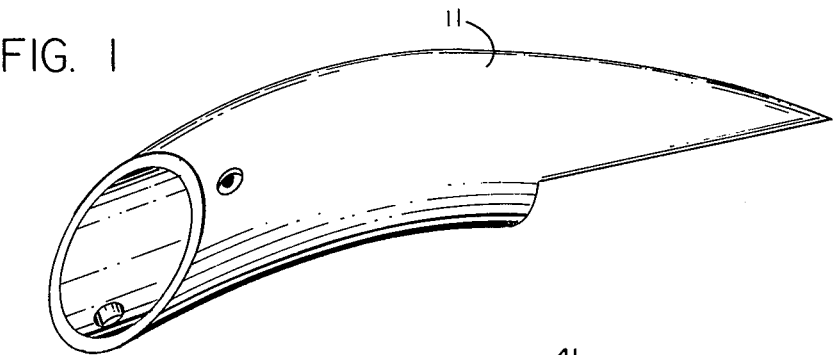
FIG. 1 is a perspective view of a typical curved product such as a fishing lure formed by the apparatus of the present invention.
Figure 2:
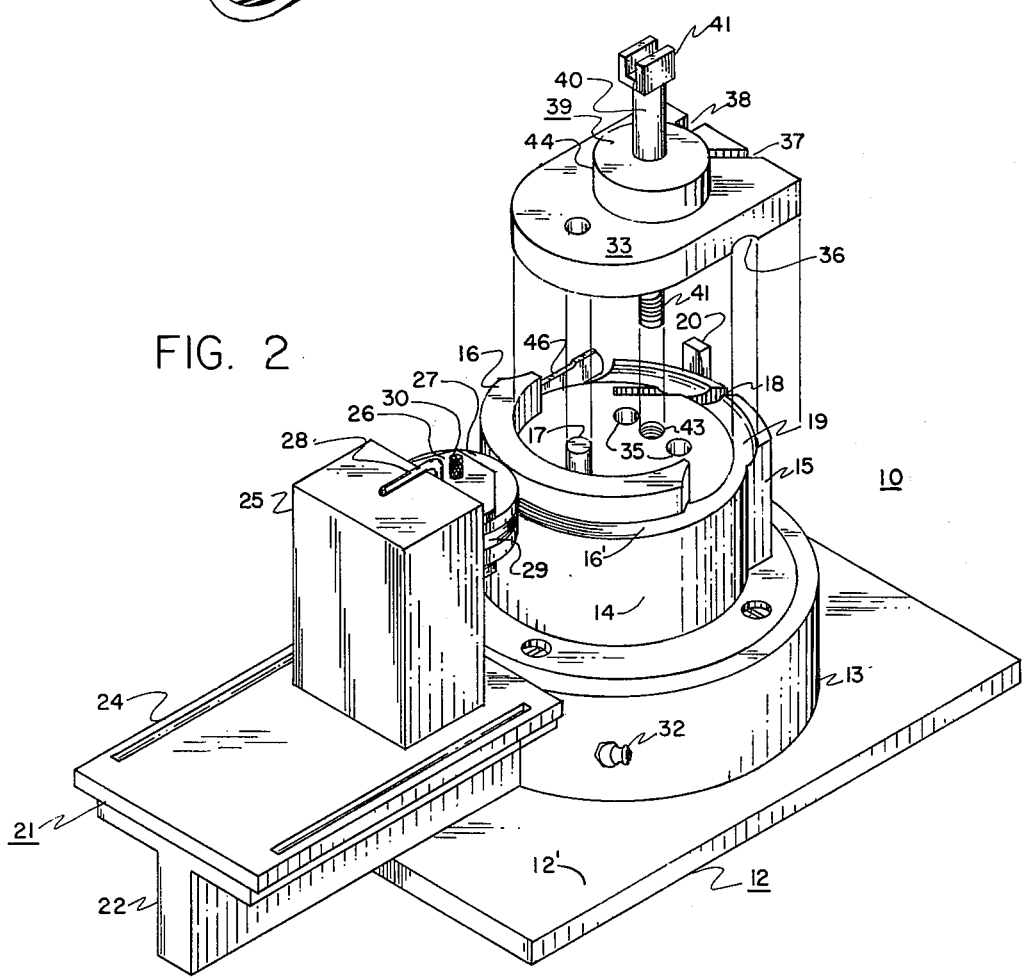
FIG. 2 is a perspective view of the mandrel of this invention with a portion of the hold-down assembly exploded away for illustrative purposes.

Referring now to the drawings, and more particularly to the FIG. 2, the mandrel of this invention is shown to advantage and generally identified by the numeral 10. The mandrel 10 is used and employed to bend and cut tubing or rods into curved products such as bodies of fishing lures 11 which is shown to advantage in the FIG. 1. The fishing lures 11 may be made of any of a variety of malleable tubing or rods of metal, polymeric materials, or the like.

Figure 3:
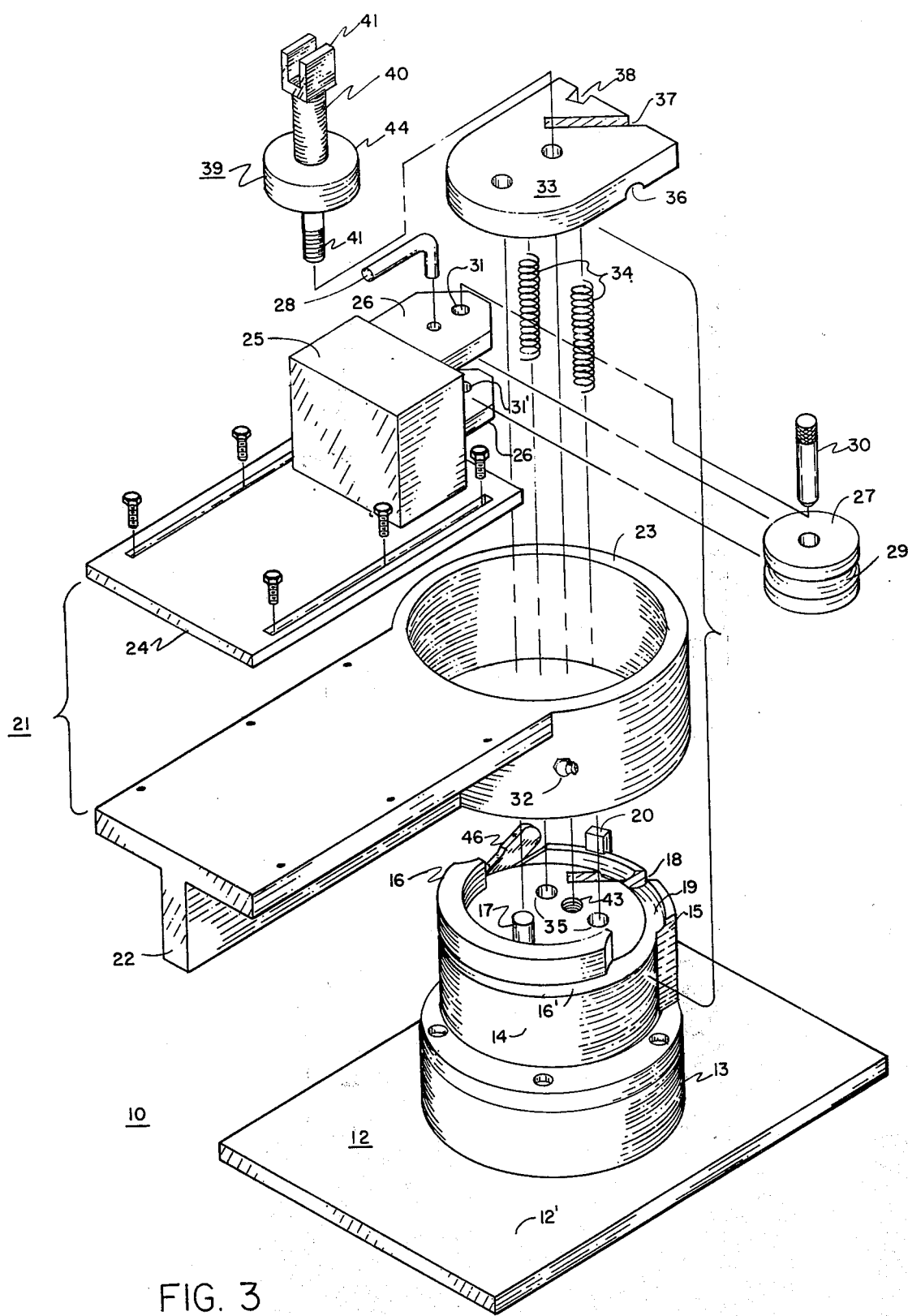
FIG. 3 is an exploded view of the several elements of this invention showing to advantage the assembly thereof.

Referring now more particularly to the FIGS. 2 and 3, the mandrel 10 comprises a base and die assembly 12 which may be suitably fastened to a work table or a milling machine commonly known in the art. The base and die assembly 12 includes a mounting portion 12', an upstanding cylindrical collar 13, a turning collar 14 having a stop portion 15, a turning guide 16, a pivot post 17, cut-off slot 18, an annular groove 19 and an upstanding locking pin 20. A bending assembly 21 is journalled for rotation on the collar 13. The bending assembly 21 comprises a mounting frame 22 having a sleeve portion 23 suitably fastened to one of the terminal ends of the mounting frame 22, and a base portion 24 suitably fastened to the frame 22 and having an upstanding block 25 suitably fastened near one of the terminal ends of the base portion 24 adjacent the turning collar 14. The block 25 is provided with a pair of outwardly projecting brackets 26 having a forming die roller 27 mounted therebetween and journalled for rotation therein. The roller 27 is caused to rotate against the turning guide 16 and the turning collar 14 in response to movement of the bending assembly 21 about the collar 13. The turning guide 16 is provided with a groove 16'. In practice, it has been found to advantage to provide cooling oil from a remote source to the roller 27 by means of the conduit 28 which is suitably carried in one of the brackets 26. The roller 27 is provided with an annular groove 29 which tends to urge tubing or rod about the groove 19 of the upstanding turning collar 14. The die roller 27 is journalled for rotation on a pin 30 carried by respective holes 31 and 31' in each of the brackets 26. It has also been found to advantage to provide means for lubrication of the sleeve 23 such as by a commonly known zerk fitting 32. The bending assembly 21 may be rotatably moved about the upstanding collar 13 and turning collar 14 by manually or automatically pushing the bending assembly. A mating die hold-down assembly 33 is mounted on the port 17 and juxtapositioned by the locking pin 20 on the uppermost terminal side of the base and die assembly 12. The die hold-down assembly 33 is held distally above the base and die assembly 12 by a pair of springs 34 mounted in holes 35 of the base assembly 12, and a pair of holes (not shown) in the die hold-down assembly. One of the terminal edges of the die hold-down assembly 33 includes a mating groove 36 is in registry and correspondence with the groove 19 of the base and die assembly 12. A cut-off slot 37 is provided in the die hold-down assembly 33 which is in registry and correspondence with the cut-off slot 18 of the base and die assembly 12. A notch 38 is provided in the die hold-down assembly 33 which is engagable with the lock pin 20 of the base and die assembly 12 when the die hold-down assembly 33 is mounted on the base assembly 12 thereby providing means for juxtapositioning the die hold-down assembly 33, including the cut-off slot 37 and the mating groove 36 with the cut-off slot 18 and the groove 19 of the base and die assembly 12.

The die hold-down assembly 33 is threadably mounted to the base and die assembly 12 by a clamp assembly 39 including a rod 40 having a yoke 41 at one of its terminal ends and having threaded portion 42 at its opposite terminal end engagable with a threaded hole 43 in the base and die assembly 12, and a hold-down collar 44 disposed above the hold-down assembly 33.

Figure 4:
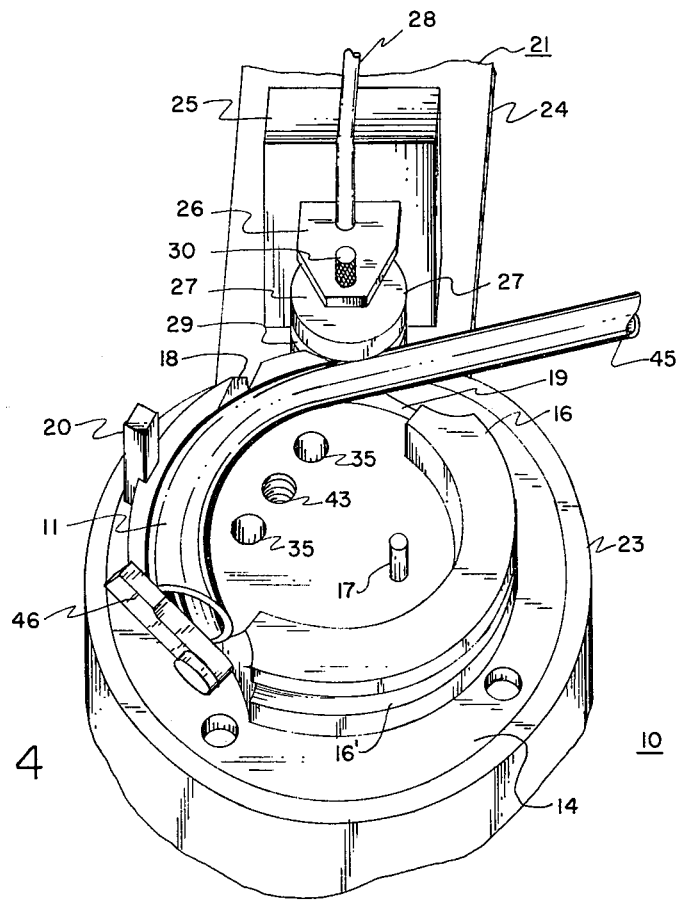
FIG. 4 is a fragmentary perspective view of the base and die assembly of this invention showing to advantage the mode of binding rod or tubing material.
Figure 5:
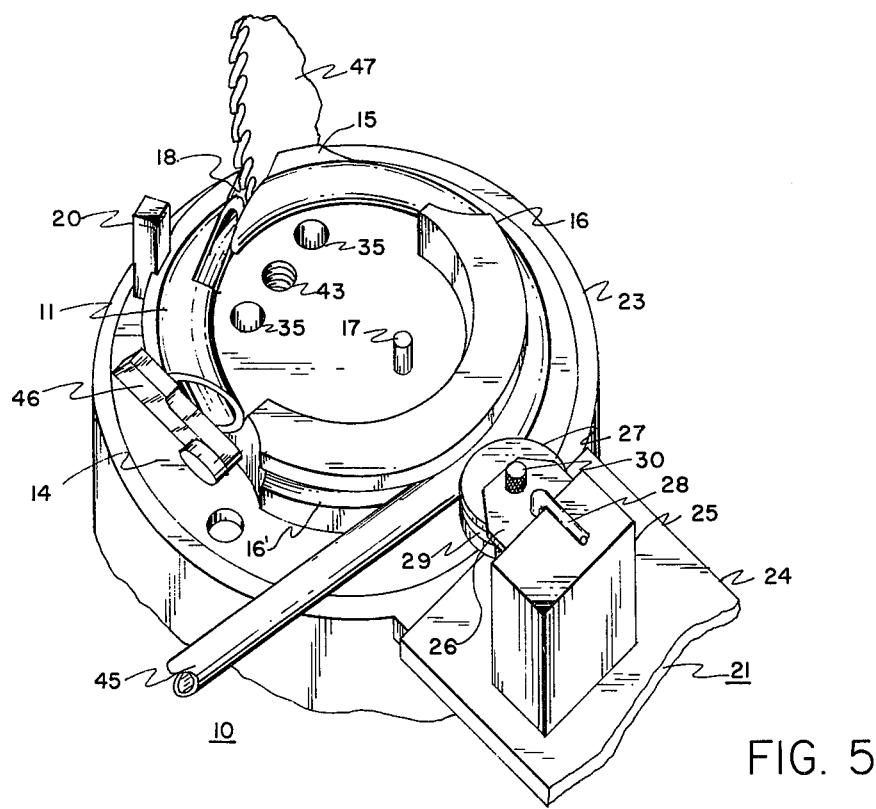
FIG. 5 is a fragmentary perspective view of the base and die assembly of this invention showing to advantage the manner of cut-off of the material and the bending assembly at its normal at rest position.

Referring now to the FIGS. 4 and 5, a piece of rod or tubing 45 is inserted between the roller 27 and the turning guide 16 in the respective grooves 29 of the roller 27 and the groove 16' of the guide 16. The bending assembly 21 is caused to be rotated clockwise on the upstanding collar 13 on the base and die assembly 12 until the die roller 27 reaches the stop 15 on the base and die assembly 12 which prevents further movement of the roller 27. The rod or tubing 45 is thus caused to be bent and conformed to the turning guide 16. The bending assembly 21 may then be returned to its normal at rest position by moving the assembly 21 counter-clockwise. The rod or tubing 45 is then further again advanced forwardly in the mandrel 10 and the foregoing steps repeated until the rod or tubing is stopped by the stock stop 46 pivotally mounted at one of the terminal ends of the turning guide assembly 16. A cut-off saw 47 is then advanced into the respective cut-off slots 18 and 37. It may be seen in the drawings that the saw kerf caused one end of the tubing to have an L-shape cut while the forward face of the tubing is smoothly cut at an angle. After the cut-off is made in the tubing, the die hold-down assembly 33 is released or raised upwardly to remove tension on the rod or tubing 45. The stock stop 46 may then be pivoted so that the finished product such as a lure 11, may be removed from the mandrel 10.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A mandrel being provided with a suitable, controlled reciprocating turning means comprising:

a base and die assembly including a mounting portion, an upstanding cylindrical collar carried by said mounting portion, a turning collar on said cylindrical collar, said turning collar having an upstanding stop portion, a turning guide carried by said turning collar and including an annular groove in one side thereof, said annular groove issuing into a second annular groove in the uppermost planar surface of said turning collar, a pivot post carried by said turning collar distally mounted from said turning guide, a cut-off slot in said upstanding turning guide, said slot being disposed at an angle in said turning guide, an upstanding material hold-down assembly locking pin and a rod or tubing stock stop pivotally carried at one of the terminal ends of said turning guide;

a bending assembly including a mounting frame having a sleeve portion suitably fastened to one of its terminal ends, a base portion fastened to said mounting frame, said base portion including an upstanding block carried near one of its terminal ends, said block having a pair of outwardly projecting brackets, and a die roller journalled for rotation between said brackets, said bending assembly being rotatably carried by said sleeve on said cylindrical collar of said base and die assembly;

a die hold-down assembly having one of its terminal edges rounded to correspond with the innermost face of said turning guide of said base and die assembly and its opposite terminal edge and side terminal edges being staight, said die hold-down assembly being privotally carried on said pivot post of said base and die assembly, said die hold-down assembly including an annular groove and a cut-off slot in registry and correspondence with said groove and said cut-off slot of said base and die assembly being juxtapositioned by said upstanding locking post of said base and die assembly; and tensioning means provided between said hold-down assembly and said base and die assembly.

* * * * *